(12) United States Patent
Reeves

(10) Patent No.: US 7,418,844 B2
(45) Date of Patent: Sep. 2, 2008

(54) LOCK WITH INTEGRAL PUMP

(76) Inventor: Robert James Douglas Reeves, 64 Ulster Street, Toronto, Ontario (CA) M5S 1E2

( * ) Notice: Subject to any disclaimer, the term of this patent is extended or adjusted under 35 U.S.C. 154(b) by 69 days.

(21) Appl. No.: 11/419,835

(22) Filed: May 23, 2006

(65) Prior Publication Data

US 2006/0266085 A1 Nov. 30, 2006

(30) Foreign Application Priority Data

May 25, 2005 (CA) .................................... 2508153

(51) Int. Cl.
*E05B 71/00* (2006.01)
(52) U.S. Cl. ................. 70/38 A; 70/39; 70/52; 70/233
(58) Field of Classification Search ............... 70/38 A, 70/41, 42, 45, 52, 57, 176, 179, 233, 234, 70/39
See application file for complete search history.

(56) References Cited

U.S. PATENT DOCUMENTS

| 4,023,387 | A | * | 5/1977 | Gould | 70/233 |
| 4,842,290 | A | * | 6/1989 | Alioto | 280/201 |
| 5,137,430 | A | * | 8/1992 | Alioto | 417/231 |
| 5,216,902 | A | * | 6/1993 | Sagi | 70/39 |
| 5,255,546 | A | * | 10/1993 | Saunders et al. | 70/233 |
| 5,513,508 | A | * | 5/1996 | Saunders et al. | 70/233 |
| 5,678,431 | A | * | 10/1997 | Yan | 70/39 |
| 5,715,554 | A | * | 2/1998 | Downs et al. | 7/138 |
| 2005/0199019 | A1 | * | 9/2005 | Marcelle et al. | 70/38 A |
| 2006/0179902 | A1 | * | 8/2006 | Reeves | 70/233 |

FOREIGN PATENT DOCUMENTS

| DE | 33 41 819 | 4/1985 |
| DE | 101 14 544 | 10/2002 |
| DE | 101 62 284 | 7/2003 |
| WO | WO-03/004811 | 1/2003 |

* cited by examiner

*Primary Examiner*—Patricia Engle
*Assistant Examiner*—Christopher Boswell

(57) ABSTRACT

A combination lock and pump having a shackle; a cross-member having a first end and a second end, the cross-member including a hole at the first end and a hole at the second end adapted to receive the shackle; a locking mechanism adapted to engage the shackle at the first end of the cross-member; a pump slidably engaging the cross-member at the second end of the cross-member, the pump having a pump shaft and a pump handle, the pump shaft including a hole to receive the shackle when the combination bicycle lock and pump is in a locked configuration; a connector for engaging an object to be pumped; a first one-way valve allowing air to enter the pump through the first one-way valve when the pump shaft is retracted from the pump and to prevent air from exiting the pump through the first one-way valve when the pump shaft is pushed into the pump; and a second one way valve preventing air from travelling into the pump from the connector but allowing air to be forced into the connector, wherein the shackle engages the cross-member and the pump when the combination bicycle lock and pump is in a locked configuration and wherein the pump forces air through the one-way valve into the connector when the pump is reciprocated within the cross-member.

18 Claims, 6 Drawing Sheets

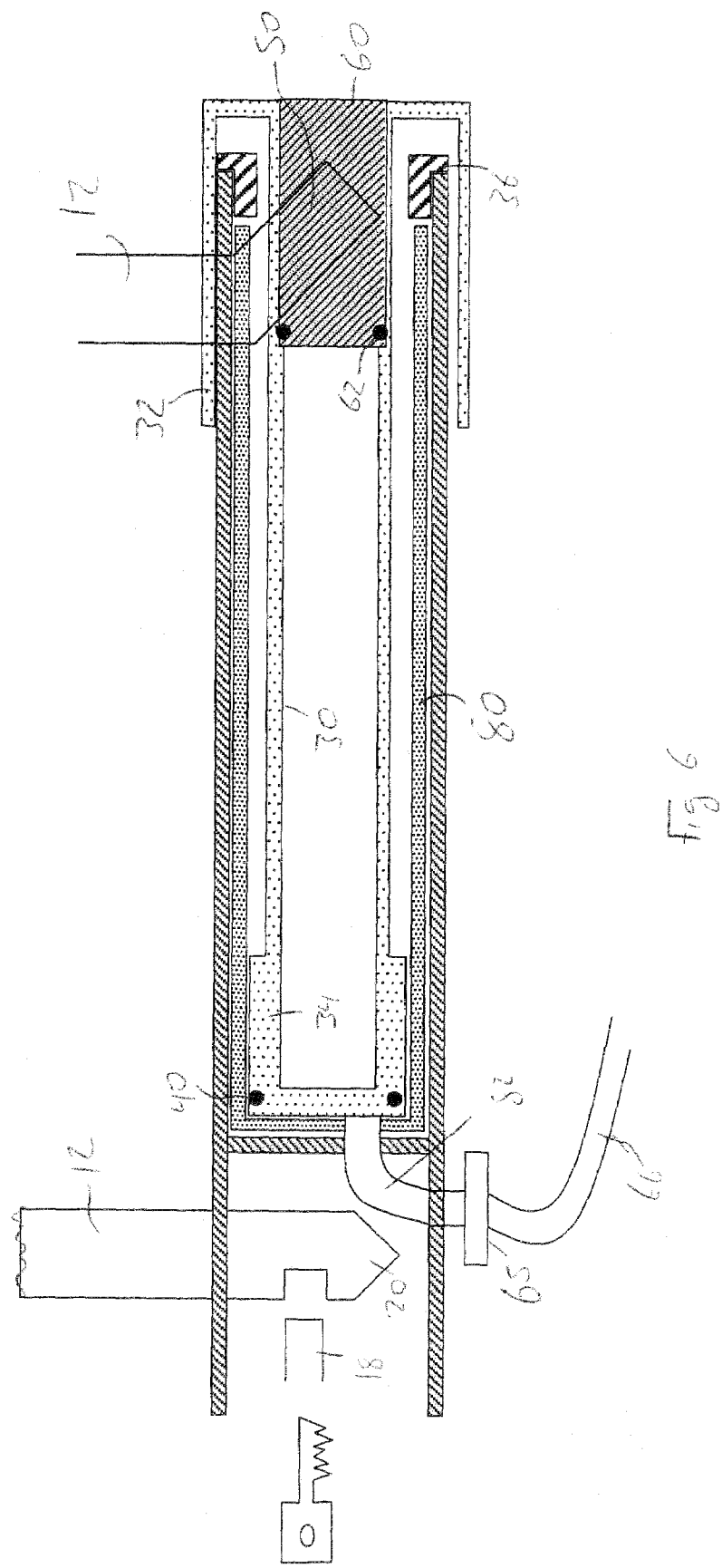

LOCK WITH INTEGRAL PUMP

FIELD OF THE INVENTION

The present invention relates to a u-lock design having a combination of a locking and pumping feature and, more specifically, to a design in which the u-lock cross member includes a pump therein, the lock tube cross member and pump engaging the shackle when the combination lock and pump are in a lock configuration.

BACKGROUND OF THE INVENTION

Bicycles are popular for recreation, exercise and transportation. Bicycles can be ridden over a long distance or a short distance, but regardless, a typical bicycle user will normally carry a number of accessories. These include, but are not limited to, a bicycle lock, a pump, spare tubes, tools for replacing tires and fixing general items, and water.

Each of the above listed accessories takes up space on the bicycle and further adds weight to the bicycle. On a bicycle, space is often at a premium. To find a good location for all of the accessories can be difficult and can preclude the addition of other accessories if all of the areas for mounting the accessories are taken up. Further, each of the above items adds weight which would be reduced if the items were somehow combined. There is also the problem of locking up additional items that are carried on a bicycle.

Attempts in the past have been made to overcome the above deficiencies. U.S. Pat. No. 5,216,902 to Gideon teaches a combination bicycle pump and lock. As illustrated in FIG. 2 of the Gideon reference, a U-shaped shackle is affixed to a lock means at one end and a handle at the other end. When U-shaped shackle is detached from handle and lock means, a pump is created. The pump has a piston rod that is generally in an inserted configuration within the cylinder but can be retracted from the cylinder and used as the shaft for a pump when a pump is required.

Gideon, however, has a number of shortcomings. The shackle in Gideon is affixed to a cross-member at first lock end and also at a second end. The second end forms the handle for the pump when the shackle is removed. This configuration provides a weaker structural support than regular locks since the handle is a movable component and pressure exerted on this can pry the shackle apart and force the handle to disengage from the shackle. Also, if the handle is disengaged from the cross-member, the pump shaft can be exposed and the lock will be easier to defeat unless the shaft is made of a sufficiently strong structural material and is fastened securely to the cross-member. These strength requirements of the pump components will increase the weight of the lock.

A further deficiency with Gideon is the use of a pump shaft 13. This shaft occupies the center of cross-member 22 when in the lock position and thus makes the space within cross-member 22 less usable for larger objects. In addition any lubricant on the surface of the pump cylinder would transfer to objects stored there.

SUMMARY OF THE INVENTION

The present invention overcomes the deficiencies of the prior art by providing a combination of lock and pump in which a shackle can be secured to the actual one piece lock tube cross member. Further, an additional advantage and one embodiment of the present invention is the use of a hollow pump shaft which can be configured for storing various items required for a bicycle.

The present apparatus includes a shackle which is affixed to a cross-member. One end of the cross-member includes a lock cylinder to engage the shackle. The other end of the cross-member preferably includes an opening for the shackle to be inserted through the cross-member, through the pump handle, and into the pump shaft. The one piece cross member provides the advantage of additional structural integrity of the lock and reduces the likelihood of the lock being defeated.

The present apparatus further provides a hollow pump shaft with a seal at one end. The shackle preferably is inserted into the pump tube when in the locked configuration, thus preventing the pump tube from being disengaged and the contents of the hollow pump shaft from being removed.

In one configuration, the cross-member provides the inner surface for the pump and one or more O-rings on the pump shaft provide an air seal against the cross-member. In an alternative configuration, the lock and pump combination further include a sleeve within the cross-member for the pump shaft to engage. In addition, said alternate configuration may also allow the pumping components to be removed from the cross-member and function as a detachable pump separate from the lock.

The present application therefore provides a combination lock and pump comprising: a shackle; a cross-member having a first end and a second end, the cross-member including a hole at the first end and a hole at the second end adapted to receive said shackle; a locking mechanism adapted to engage said shackle at the first end of said cross-member; a pump slidably engaging said cross-member at said second end of said cross-member, said pump having a pump shaft and a pump handle, the pump shaft including a hole to receive said shackle when said combination bicycle lock and pump is in a locked configuration; a connector for engaging an object to be pumped; a first one-way valve allowing air to enter said pump through said first one-way valve when said pump shaft is retracted from said pump and to prevent air from exiting said pump through the first one-way valve when said pump shaft is pushed into said pump; and a second one way valve preventing air from travelling into the pump from the connector but allowing air to be forced into the connector, wherein said shackle engages said cross-member and said pump when said combination bicycle lock and pump is in a locked configuration and wherein said pump forces air through said one-way valve into said connector when said pump is reciprocated within said cross-member.

BRIEF DESCRIPTION OF THE DRAWINGS

The present apparatus will be better understood with reference to the drawings in which:

FIG. 6 is a cross-sectional view of an alternative embodiment of the lock and pump combination.

DETAILED DESCRIPTION

Reference is now made to the drawings. As with standard locks, the present apparatus includes a shackle 12 and a cross-member 14. Shackle 12 is preferably a U-shaped shackle but other configurations are possible, including a D-shape or even a flexible shackle with ends adapted to be engaged to cross-member 14.

Shackle 12 is preferably comprised of a hardened steel and coated with a plastic material for protection and durability. The shackle cross-section is typically round but other cross-sections are possible such as but not limited to square or hexagonal shaped.

Cross-member 14 is also preferably comprised of a hardened steel with a plastic outer coating. Cross-member 14 is preferably cylindrical but other configurations are possible, including a hexagonal cross-section, square cross-section or other shaped cross-section that would accommodate a pump shaft.

A first end of cross-member 14 is adapted to accommodate a lock 18 to engage a lock end 20 of shackle 12. Locks 18 are well known in the art and can include a number of configurations with a number of different locking mechanisms and keys. The present application is not meant to be limited by any specific locking mechanism. In addition the locking mechanism can be located on either side of the shackle.

Figure 1:
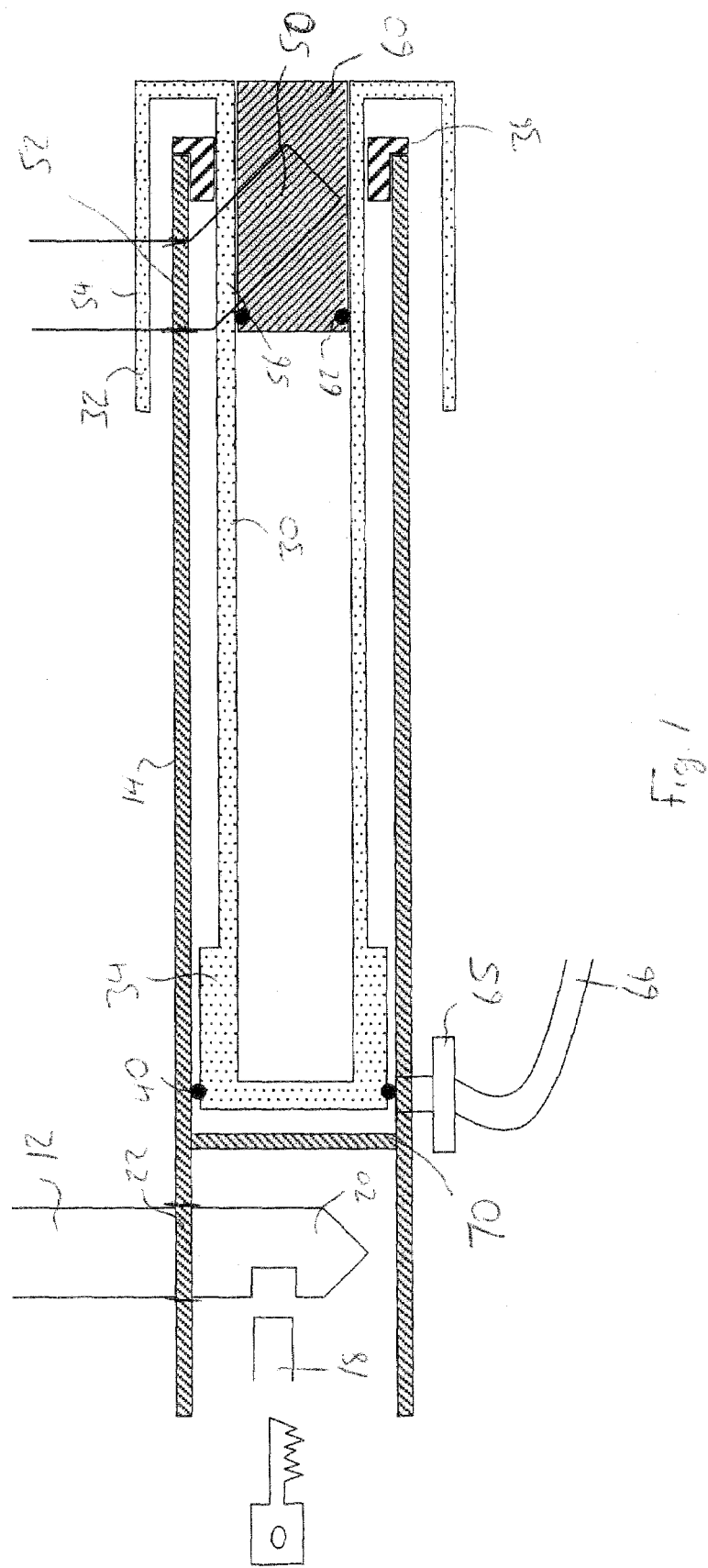
FIG. 1 is a cross-sectional view of the cross-member engaging the shackle.
Figure 3:
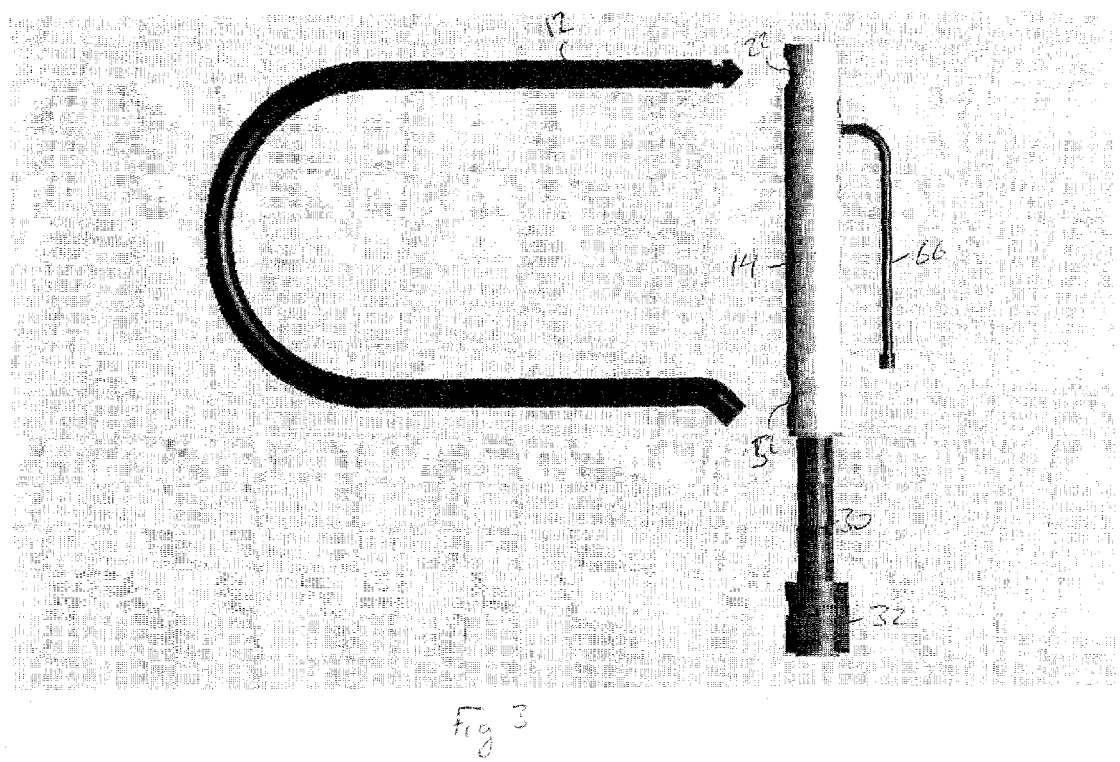
FIG. 3 is a side elevational view of the lock and pump combination in a pump configuration.

Shackle 12 is inserted into a hole 22 within cross-member 14 at the first end, as best seen in FIGS. 1 and 3.

A second end of cross-member 14 opposite to said first end is adapted to accommodate a pump shaft 30. Pump shaft 30 includes a pump handle 32 at one end thereof. Pump handle 32, in a preferred embodiment, is configured to accommodate the second end of cross-member 14 under pump handle 32 when the pump and lock combination is in a locked configuration. However, as would be appreciated by those skilled in the art, other configurations for pump handle 32 are possible.

Pump shaft 30 includes a shaft end 34 at an opposite side of pump shaft 30 to pump handle 32. Shaft end 34 preferably includes an outer diameter that is wider than the outer diameter of pump shaft 30 and a stopper 36 is affixed to cross-member 14, thereby preventing pump shaft 30 from being removed from cross-member 14. This is important in a pumping configuration since pump shaft 30 could easily be dislodged form cross-member 14 without these two components. Pump tube 30 and handle 34 can be fabricated in separate/multiple pieces.

The addition of some form of sensing, receiving and transmitting device is possible to store within the pump shaft. This could provide a motion detection capability and or the ability to feedback the air pressure being created by the pump.

In order to provide a seal, at least one O-ring 40 is provided around shaft end 34 in the preferred embodiment. Shaft end 34 could include a groove within which O-rings 40 could sit and multiple O-rings could be used. In one embodiment, air can enter the cross-member 14 using the o-ring as a one-way valve. The o-ring seal shown allows the ring to flex when the pump shaft is extended and air is able to enter the pump cylinder and provides an air tight seal when the pump shaft is driven in the opposite direction as air is pushed out of the pump hose. This o-ring seal is a common method of providing a unidirectional seal and is not meant to be limiting as other sealing methods are possible and well know to those skilled in the art.

Shackle 12 has a second end which preferably includes a bend therein. The bend provides one of the main sources of strength to this style of U-lock when in a locked configuration. Second end 50 of shackle 12 is adapted to fit within a hole 52 within cross-member 14. The insertion of the shackle 12 into the one piece cross-member 14 provides additional strength over prior art solutions.

In a preferred embodiment, shackle end 50 of shackle 12 preferably also is inserted through a hole 54 within pump handle 32 and also through a hole 56 within pump shaft 30. By inserting the shackle end 50 through pump shaft 30 this locks pump shaft 30 in place. This is also enhanced by the preferable embodiment of inserting it through pump handle 32. However, as would be appreciated by those skilled in the art, if the pump handle does not extend over cross-member 14, then it is not required to have shackle end 50 extend through pump handle 32.

In the preferred embodiment, pump shaft 30 is hollow to allow for the storage of items within pump shaft 30. Such items could include, but are not limited to, extra tubes, tools for repairing parts of the bicycle, the hose for the lock-pump combination, among other things. If pump shaft 30 is hollow, a stopper 60 is included to close the end of hollow pump shaft 30. Stopper 60 includes a seal 62 at one end to provide a watertight storage compartment within pump shaft 30.

In a locked configuration, stopper 60 includes a hole to accommodate the shackle end 50. The hole within stopper 60 further provides the advantage that when in a locked configuration, the shackle end 50 locks the stopper 60 in place, thereby preventing someone from removing the stopper and the contents of the lock.

Figure 2:
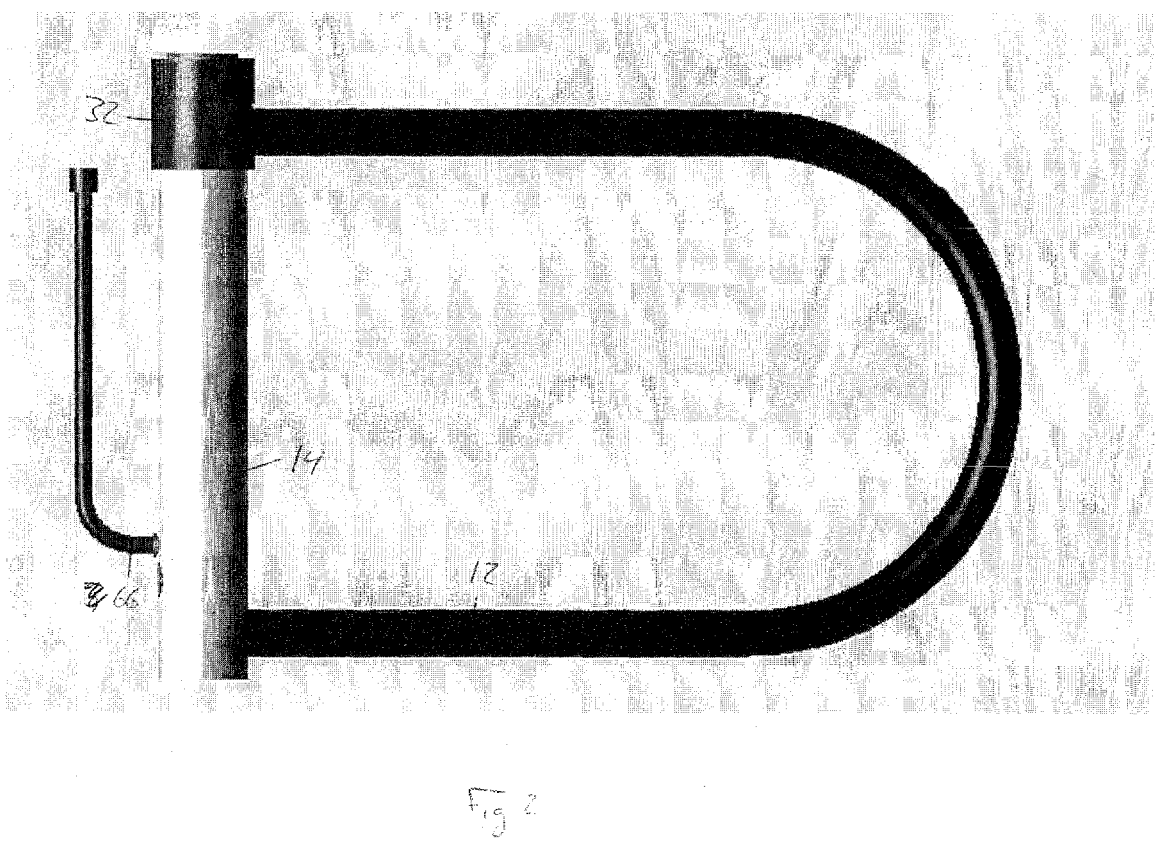
FIG. 2 is a side elevational view of the lock and pump combination in a lock configuration.

A lock when fully assembled resembles a lock that is presently on the market and provides the same level of security as locks on the market. This can best be seen in FIG. 2.

Figure 5:
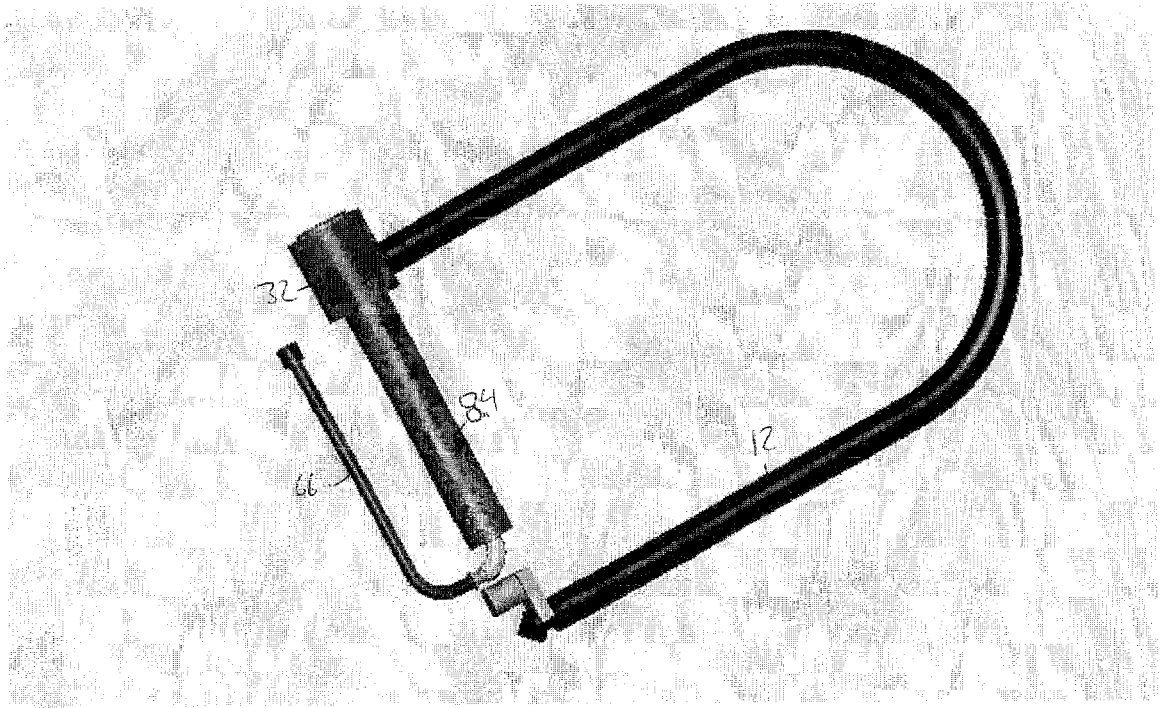
FIG. 5 is a side elevational view of the lock and pump combination with the cross-member removed.

Further, with reference to FIG. 5, FIG. 5 shows the lock and pump combination in the locked configuration with cross-member 14 removed for illustrative purposes. This shows how the various elements are put together when in the locked configuration.

In order to move to a pump configuration, shackle 12 is removed from cross-member 14 as is best seen in FIG. 3. By removing shackle 12, pump shaft 30 is free to move within cross-member 14.

Cross-member 14 further includes a pump hose with a valve 65 affixed therein. The valve is a one-way valve thereby preventing air from entering cross-member 14 when pump shaft 30 is pulled out of cross-member 14 but requires air to be forced into hose 66 when pump shaft 30 is pushed towards the lock end of cross-member 14. A sealed divider 70 exists between the lock end of cross-member 14 and the pump end of cross-member 14 to ensure air is forced into hose 66. In an alternative configuration, hose 66 could be a connector that fits directly onto the tube nozzle of a tire or object being pumped. In this case the connector will incorporate a one-way valve 65 and no external hose is required.

Figure 4:
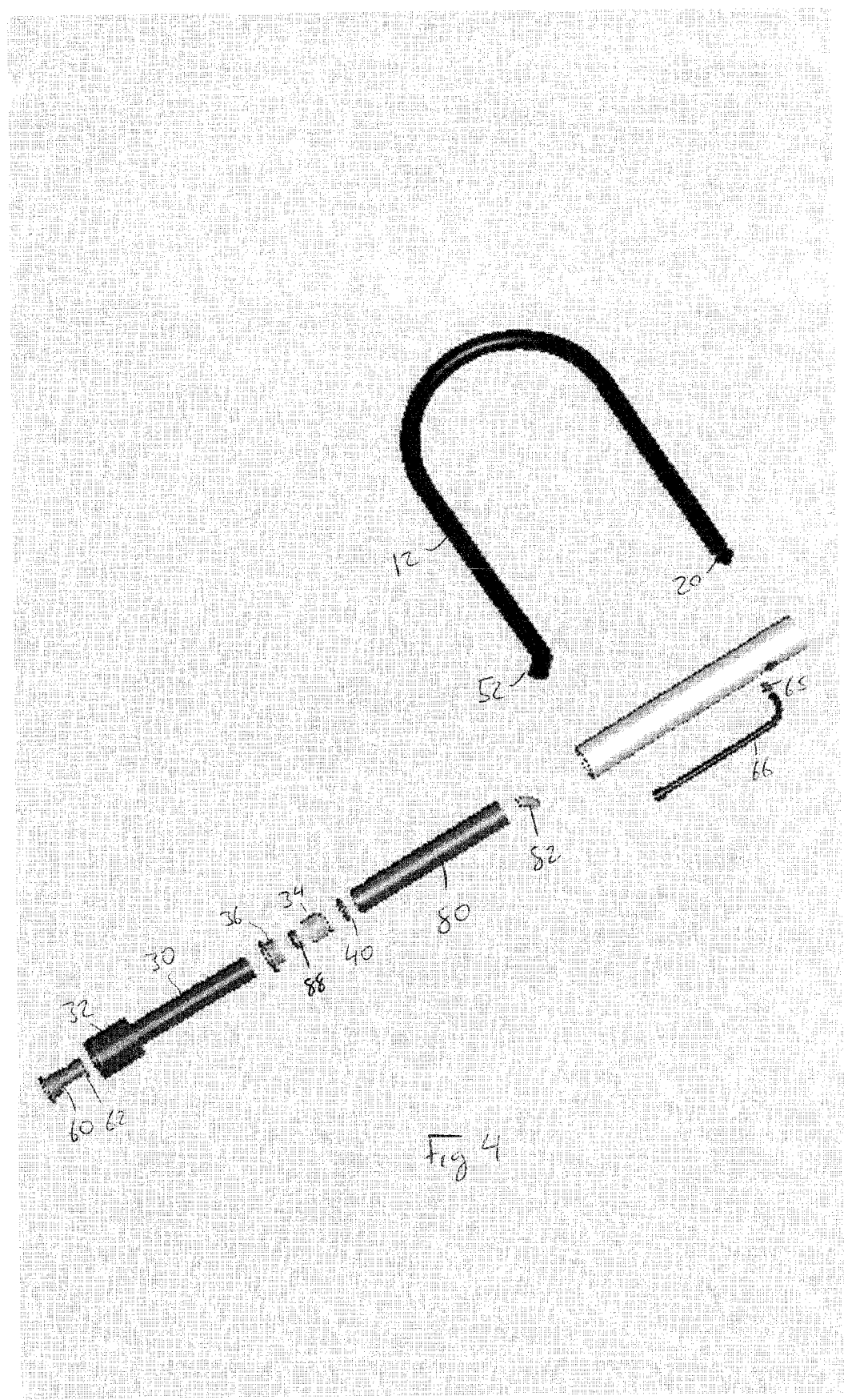
FIG. 4 is an exploded view of the lock and pump configuration.

FIG. 4 shows an exploded view of the elements of lock-pump combination and how they are assembled. FIG. 4 includes a sensor element 88 as an optional feature. Sensor element 88 could include features such as a motion sensor and communication means to communicate to the owner of the lock that someone is moving and potentially tampering with the lock. Such communication means could advantageously use items such as the shackle and/or the cross member 12 as an antenna in one configuration.

Other sensors could further be included, such as a sensor to sense the disengagement of the shackle 12 from the lock mechanism 18 or cross member 14. This list of potential sensors above is not meant to be limiting and other sensors could be utilized.

A user of the lock-pump combination therefore, based on the above, can use the combination in a locked configuration by inserting end 50 into cross-member 14, pump shaft 30, and stopper 60 and can thereafter lock end 20 through a lock mechanism 18. This provides a configuration that can be used to lock a bicycle up or for transporting the lock-pump combination.

When a user has a flat tire, the user can remove shackle 12 from cross-member 14. Further, stopper 60 can be removed to obtain whatever tools and components such as a patch kit that are required to replace the flat tire. The user can then connect hose 66 to the new tire tube or patched tire tube and can use pump handle 32 to pump air into the tube. Air is forced into tube 66 through the air seal formed by O-rings 40 and by the sealed divider 70.

Once the user is finished pumping the new tire tube or patched tire, hose 66 can be disengaged from the tire. Further, if hose 66 is removable from cross-member 14, the tube can be removed and placed within pump shaft 30. Further, access tools can also be placed within pump shaft 30. Seal 60 is then replaced and shackle 12 can be reinserted through pump handle 32, cross-member 14, pump shaft 30 and stopper 60 to form a bicycle lock configuration. This bicycle lock can then be placed back onto the frame of the bicycle and the user can continue riding the bicycle.

Reference is now made to FIG. 6. FIG. 6 shows an alternative embodiment to the present apparatus. In the configuration of FIG. 6, a sleeve 80 is added. Sleeve 80 may be required depending on the ability to construct a smooth inner surface of cross-member 14 to provide a better pumping ability. Further, in either the main embodiment or the alternative embodiment of FIG. 6, a hose connector 82 may be inserted through the pump sleeve, through the sealed divider and be connected to the pump with a valve 65.

One further advantage of sleeve 80 is that the pump could be removable from cross-member 14. The removal of the pump from the cross-member could allow a user to have a smaller unit for pumping. Other advantages would be evident to the skilled user.

As will be appreciated by those skilled in the art, lighter materials such as plastic or aluminium are preferred for various components, including pump shaft 30, sleeve 80, and stopper 36. However, other materials are possible.

The above therefore provides for a combination of pump and lock in which the lock has an improved structure due to the insertion of the shackle into a one piece cross-member and in which the pump shaft can be used to store various items.

The above-described embodiments are illustrative of preferred embodiments and are not intended to limit the scope of the present invention. Also, various modifications, which would be readily apparent to one skilled in the art, are intended to be within the scope of the present invention. The only limitations to the scope of the present invention are set forth in the following claims.

The invention claimed is:

1. A combination lock and pump comprising:
   a) a shackle;
   b) a single piece cross-member having a first end and a second end, the cross-member including a hole at the first end and a hole at the second end adapted to receive said shackle;
   c) a locking mechanism adapted to engage said shackle at the first end of said cross-member;
   d) a pump slidably engaging said cross-member at said second end of said cross-member, said pump having a pump shaft and a pump handle, the pump shaft including a hole to receive said shackle when said combination bicycle lock and pump is in a locked configuration;
   e) a connector for engaging an object to be pumped;
   f) a first one-way valve allowing air to enter said pump through said first one-way valve when said pump shaft is retracted from said pump and to prevent air from exiting said pump through the first one-way valve when said pump shaft is pushed into said pump; and
   g) a second one way valve preventing air from travelling into the pump from the connector but allowing air to be forced into the connector,
   wherein said shackle engages said cross-member and said pump when said combination bicycle lock and pump is in a locked configuration and wherein said pump forces air through said one-way valve into said connector when said pump is reciprocated within said cross-member.

2. The combination lock and pump of claim 1, wherein said pump shaft is hollow.

3. The combination pump and lock of claim 2, further comprising a stopper adapted to fit within said pump shaft, said stopper having a hole to engage said shackle when said combination bicycle lock and pump is in the locked configuration.

4. The combination lock and pump of claim 1, wherein said pump further includes a pump end, the outer diameter of said pump end being larger than the outer diameter of said pump shaft.

5. The combination lock and pump of claim 4, further comprising a shaft stopper, said shaft stopper adapted to allow said pump shaft to slide within said cross-member but to engage said pump and prevent said pump end from being removed from said cross-member during normal operation.

6. The combination lock and pump of claim 1, wherein said pump includes a seal for engaging an inner surface of said cross-member, thereby providing an air seal with said cross-member.

7. The combination lock and pump of claim 6, wherein the seal is an o-ring.

8. The combination lock and pump of claim 7, wherein the o-ring seal is the first one-way valve.

9. The combination lock and pump of claim 1, further comprising a sleeve within said cross-member, said pump shaft adapted to engage said sleeve in an airtight manner.

10. The combination lock and pump of claim 9, further comprising a seal to engage said sleeve.

11. The combination lock and pump of claim 9, wherein said pump and sleeve are removable from said cross-member.

12. The combination lock and pump of claim 1, wherein said pump handle includes a hole therein, said hole adapted to accommodate said shackle when said combination bicycle lock and pump is in a locked configuration.

13. The combination lock and pump of claim 1 further comprising a sealed divider between the locking mechanism and pump.

14. The combination lock and pump of claim 1 wherein the shackle includes a bent foot to engage said second end of said cross-member.

15. The combination lock and pump of claim 1 wherein the combination further includes a sensing element within a storage tube, the sensing element adapted to detect tampering with said combination lock and pump.

16. The combination lock and pump of claim 15, wherein the sensing element includes a motion sensor.

17. The combination lock and pump of claim 15, wherein the sensing element includes communication means to communicate with a user.

18. The combination lock and pump of claim 17, further comprising an antenna for said communication means.

* * * * *